(12) United States Patent
Arai et al.

(10) Patent No.: US 8,394,467 B2
(45) Date of Patent: Mar. 12, 2013

(54) LIQUID CRYSTALLINE MEDIUM AND LIQUID CRYSTAL DEVICE

(75) Inventors: Yuko Arai, Kanagawa Pref. (JP); Takanori Takeda, Kanagawa Pref. (JP); Yasushi Sugiyama, Kanagawa Pref. (JP); Hideo Ichinose, Odawara (JP)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 54 days.

(21) Appl. No.: 13/071,639

(22) Filed: Mar. 25, 2011

(65) Prior Publication Data

US 2011/0234968 A1 Sep. 29, 2011

(30) Foreign Application Priority Data

Mar. 26, 2010 (EP) .................................. 10003247

(51) Int. Cl.
*C09K 19/20* (2006.01)
*C09K 19/30* (2006.01)
*C09K 19/12* (2006.01)
*G02F 1/133* (2006.01)

(52) U.S. Cl. ............. 428/1.1; 252/299.63; 252/299.66; 252/299.67; 349/15

(58) Field of Classification Search .................. 428/1.1; 252/299.63, 299.66, 299.67; 349/15
See application file for complete search history.

(56) References Cited

U.S. PATENT DOCUMENTS

| | | | |
|---|---|---|---|
| 5,089,905 A * | 2/1992 | Sasaki et al. ................... 349/97 |
| 6,190,576 B1 * | 2/2001 | Andou et al. ........... 252/299.63 |
| 6,197,217 B1 * | 3/2001 | Kondo et al. ........... 252/299.66 |
| 6,210,761 B1 * | 4/2001 | Kondo et al. ................. 428/1.1 |
| 6,603,522 B1 * | 8/2003 | Kaneko ........................... 349/117 |
| 7,081,279 B2 * | 7/2006 | Kato et al. ...................... 428/1.1 |
| 2004/0065866 A1 * | 4/2004 | Kato et al. ............... 252/299.61 |

FOREIGN PATENT DOCUMENTS

DE 10135247 A1 * 5/2002
JP 61025124 A * 2/1986

OTHER PUBLICATIONS

Engish translation by computer for DE10135247, provided by EPO (2002).*

* cited by examiner

*Primary Examiner* — Shean C Wu
(74) *Attorney, Agent, or Firm* — Millen, White, Zelano & Branigan, P.C.

(57) ABSTRACT

The instant invention relates to dielectrically positive nematic media comprising one or more compounds of formula I

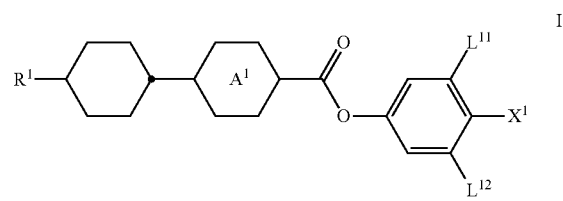

and one or more compounds of formulae II and III

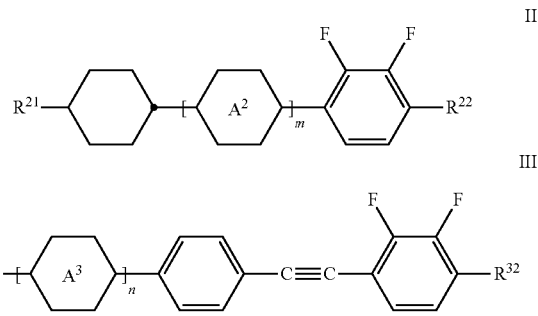

and optionally one or more compounds of formulae IV and V

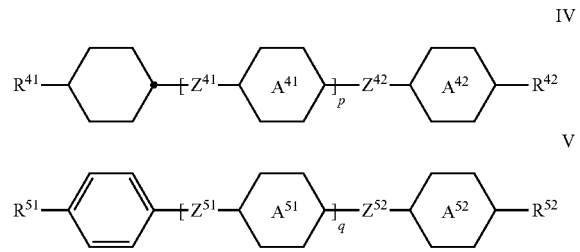

and liquid crystal devices comprising these media and especially to fast switching electro-optical devices.

26 Claims, No Drawings

US 8,394,467 B2

LIQUID CRYSTALLINE MEDIUM AND LIQUID CRYSTAL DEVICE

FIELD OF THE INVENTION

The present invention relates to liquid crystalline media, preferably to dielectrically positive, nematic media, comprising one or more dielectrically positive compounds, one or more dielectrically negative compounds and optionally one or more dielectrically neutral compounds, which are especially useful for two-frequency addressing and to liquid crystal devices comprising these media, especially to fast switching optical devices, e.g. devices operable as electro-optical shutters.

STATE OF THE ART AND PROBLEM TO BE SOLVED

Liquid Crystal Displays (LCDs) are widely used to display information, LCDs are used for direct view displays, as well as for projection type displays. The electro-optical mode which is employed for most displays still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, as e.g. the vertically aligned nematic (VAN), the patterned ITO vertically aligned nematic (PVA)-, the polymer stabilized vertically aligned nematic (PSVA)-mode and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multi media applications and thus are competing with the TN-LCDs.

Besides these well established applications of the various electro-optical effects of liquid crystals in displays, there are several other electro-optical devices using liquid crystals. Amongst these are printer, respectively scanner heads, wavefront correctors and, last not least, electro-optical shutters. The latter may be applied in technical apparatus as well as in cameras, and, as of recently, also in shutters for displays, which are capable of displaying three dimensional (short 3D) images. Such 3D displays exploit electro-optical shutters to discriminate the separate optical channels delivering the information to either one of the eyes of an observer or a multitude of observers. A rather straightforward embodiment for a respective display uses spectacles, which are worn by the observer, respectively the observers. On glass each of these spectacles is responsible for switching the image for the corresponding eye "on" and "off".

Another embodiment uses a single shutter in front of a whole display. But also designs with shutters divided into pixels have been demonstrated.

For such displays the liquid crystal shutters have to show particularly fast response times. These fast response times can in many cases not be simply achieved by conventional means, like e.g. using liquid crystal cell having a small cell gap, operating the liquid crystal cells at an elevated temperature or using "overdriving".

In particular, the response times for switching the devices from the "on"-state to the "off"-state have to be improved significantly. In most typical electro-optical effects the switching from the "on"-state to the "off"-state is brought about by the internal restoring forces in the liquid crystal media upon interruption of the application of the addressing voltage. Thus, there is no possibility to influence this switching behaviour by the addressing scheme. There is just a limited possibility to increase the respective response speed by application of liquid crystal materials having relatively large elastic constants.

A more practically viable way to improve just these response times of the devices, however, is the use of so called "two-frequency" (or "dual-frequency") addressing. Here special liquid crystal media are employed, which are characterized by the following dielectric behaviour. The media are characterized at the operation temperature at a certain frequency of the addressing voltage by having a positive dielectric anisotropy ($\Delta\epsilon \equiv \epsilon_{\|} - \epsilon_{\perp}$) between the dielectric constant parallel ($\epsilon_{\|}$) to the director of the liquid crystals and the dielectric constant perpendicular ($\epsilon_{\perp}$) to the director of the liquid crystals. Upon increase of the frequency of the addressing voltage the dielectric anisotropy decreases (due to the dielectric relaxation) and the dielectric anisotropy changes its sign from positive to negative. Thus, the direction of the torque exerted on the liquid crystal director by an electric field changes.

At the so called "frequency of relaxation", at which the dielectric anisotropy changes its sign. At frequencies below said frequency of relaxation the liquid crystal medium is dielectrically positive and, consequently the director aligns itself parallel to the direction of the electric field, provided the electric filed has a sufficiently high filed strength. (Some electro-optical effects do exhibit an electro-optical characteristic having a pronounced threshold.) At frequencies above said frequency of relaxation the liquid crystal medium is dielectrically negative and, consequently the director aligns itself perpendicular to the direction of the electric field.

From this behaviour it is clearly obvious that with a given configuration of the electrode in a liquid crystal cell, by applying an operation voltage either below or above the relaxation frequency of the liquid crystal medium, the direction of switching of the director of the liquid crystal medium can be reversed e.g. from perpendicular to parallel to the surface and vice versa. Thus, both the process of switching "on" and of switching "off" of a respective device is driven by the electric field. Consequently both directions of changes of the orientation of the director are switched actively, i.e. controlled by the applied operation voltage. Respective devices are characterised by particularly short response times both for switching "on" and for switching "off".

The liquid crystals (LCs) according to the present invention are preferably used in improved LC devices using two frequency addressing. They are particularly useful for operation as fast switching electro-optical devices, e.g. as shutters.

For these applications new liquid crystalline media with improved properties are required. Thus liquid crystalline media with improved behaviour are required. Their rotational viscosity should be as low as possible. Besides this parameter, the media have to exhibit a suitably wide range of the nematic phase, an appropriate birefringence ($\Delta n$), preferably in the range from 0.100 to 0.350 and a suitably high dielectric anisotropy ($\Delta\epsilon$). $\Delta\epsilon$ has to be sufficiently high to allow a reasonably low operation voltage. Preferably $\Delta\epsilon$ should be 1.0 or more, in order to allow use easy accessible drivers with reasonably low operation voltages. However, Δ∈ should preferably be 10 or less. Further the media have to show sufficiently low frequency of dielectric relaxation to be applicable for two-frequency addressing and a sufficiently large dielectric anisotropy perpendicular to the liquid crystal director. At the same time, preferably, $\in_\perp$ should be 5.0 or more, more preferably 6.0 or more, most preferable 7.0 or more. However, $\in_\perp$ should preferably be 10 or less.

The displays according to the present invention are preferably active matrix LCDs, short AMDs, addressed by an active matrix, preferably by a matrix of thin film transistors (TFTs). However, the inventive liquid crystals can also beneficially be used in displays with other known addressing means.

Liquid crystal compositions suitable for LCDs and in particular for TN-displays are already widely known. These compositions, however, do have significant drawbacks. Most of them, besides having other deficiencies, lead to unfavourably high response times and/or to contrast ratios, which are too low for many applications. They also most generally have insufficient reliability and stability, in particular against exposure to heat, moisture or irradiation by light and in particular UV, especially when one or more these stressors are combined with each other.

Thus, there is a significant need for liquid crystalline media with improved suitable properties for practical applications such as a wide nematic phase range, appropriate optical anisotropy Δn, suitably high values of Δ∈ and $\in_\perp$, and appropriate relaxation frequencies, leading to fast response times in electro-optical devices and, last not least, a good reliability.

PRESENT INVENTION

Surprisingly, it now has been found that liquid crystalline media with a suitable phase range, suitably high values of Δ∈, $\in_\perp$, appropriate relaxation frequencies, suitable Δn and suitable phase ranges can be realized, which do not exhibit the drawbacks of the materials of the prior art or at least do exhibit them to a significantly lesser degree.

These improved liquid crystalline media according to the instant application comprise at least
one, two, three or more compounds of formula I

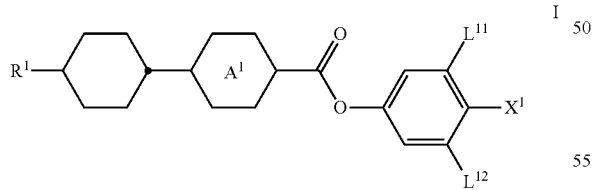

wherein
$R^1$ is alkyl or alkoxy with 1 to 7 C-atoms or alkenyl, alkenyloxy or alkoxyalkyl with 2 to 7 C-atoms

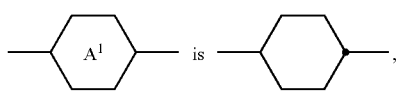

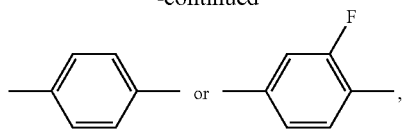

preferably

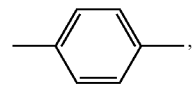

$L^{11}$ and $L^{12}$ are independently of each other H or F, preferably $L^{11}$ is F and $L^{11}$ and $L^{12}$ is H or F more preferably $L^{12}$ is H and
$X^1$ is CN or NCS, preferably CN and
one or more compounds selected from the group of compounds of formulae II and III, preferably one or more compounds of each of them,

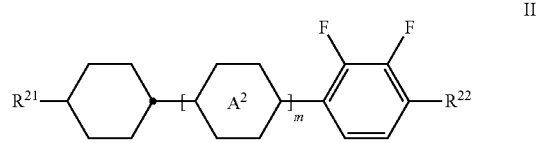

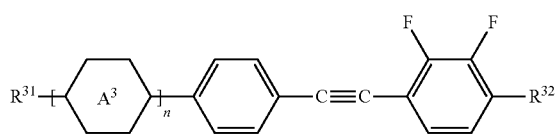

wherein
$R^{21}$, $R^{22}$, $R^{31}$ and $R^{32}$ are independently of each other alkyl or alkoxy with 1 to 7 C-atoms, alkenyl, alkenyloxy or alkoxyalkyl with 2 to 7 C-atoms, preferably
$R^{21}$ and $R^{31}$ are independently of each other alkyl or alkenyl and
$R^{22}$ and $R^{32}$ are independently of each other alkyl or alkoxy,

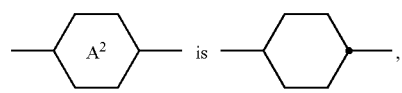

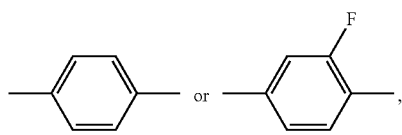

preferably

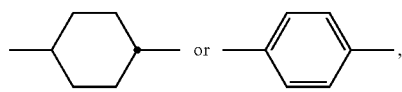

most preferably

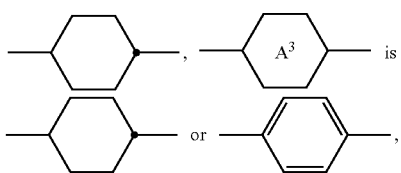

preferably

m and n are independently of each other 0 or 1 and optionally one, two or more compounds selected from the group of formulae IV and V, preferably to or more compounds of at least one of these formulae, IV
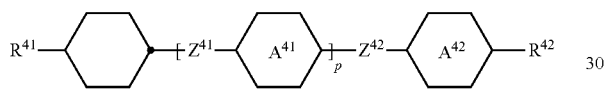

V
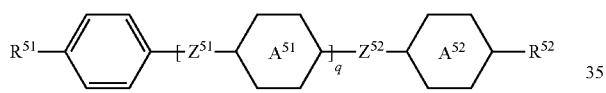

wherein $R^{41}$ to $R^{52}$ independently of each other have the meaning given for $R^2$ under formula II above, preferably $R^{41}$ is alkyl and $R^{42}$ is alkyl or alkoxy or $R^{41}$ is alkenyl and $R^{42}$ is alkyl, preferably $R^{51}$ is alkyl and $R^{52}$ is alkyl or alkenyl, or $R^{51}$ is alkenyl and $R^{52}$ is alkyl or alkenyl, preferably alkyl,

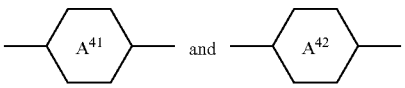

independently of each other and in case

is present twice, also these independently of each other are

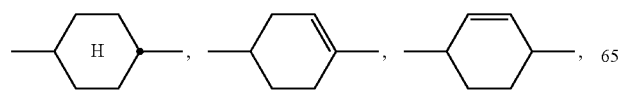

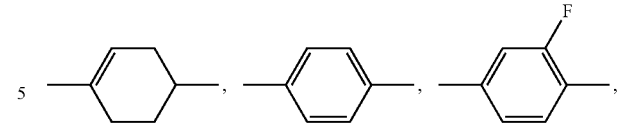

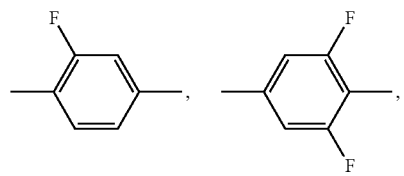

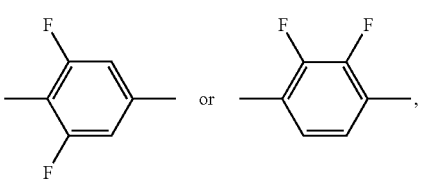

preferably at least one of

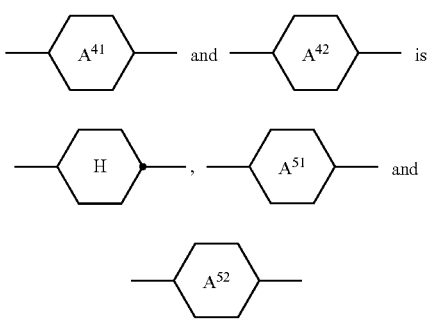

independently of each other and in case

is present twice, also these independently of each other are

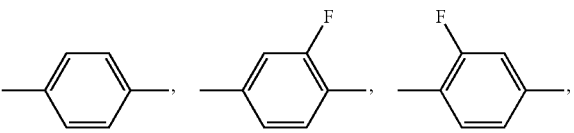

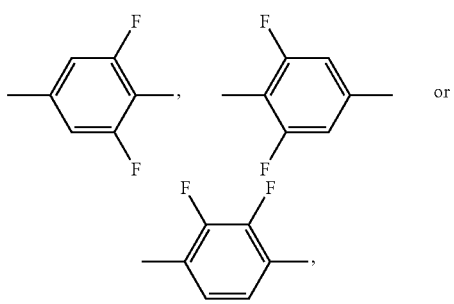

preferably at least one of

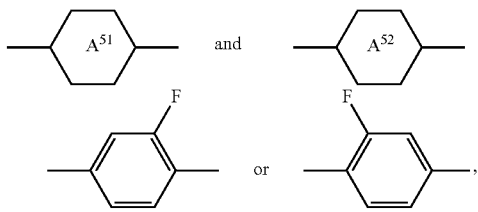

$Z^{41}$ to $Z^{52}$ independently of each other, and in case $Z^{41}$ and/or $Z^{51}$ is/are present twice, also these independently of each other, are —CH$_2$CH$_2$—, —COO—, trans- —CH=CH—, trans-CF=CF—, —CH$_2$O—, —CF$_2$O—, —C≡C— or a single bond, preferably at least one of $Z^{41}$ and $Z^{42}$ and at least one of $Z^{51}$ and $Z^{52}$ each is a single bond, p and q are independently of each other 0, 1 or 2,
p preferably is 0 or 1.

In a preferred embodiment of the present invention the liquid crystalline media according to the instant application comprise one or more compounds of formula I selected from the group of compounds of its sub-formulae I-1 to I-3, preferably selected from formulae I-2 and I-3, most preferably of formula I-2

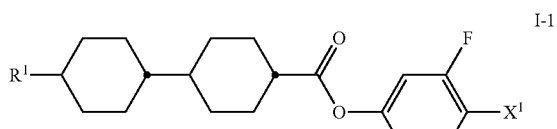

I-1

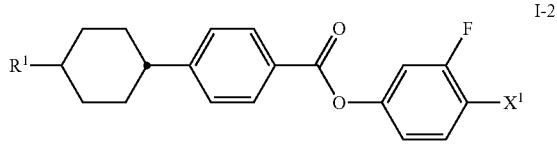

I-2

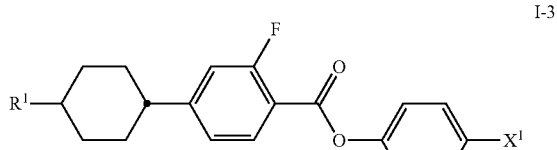

I-3 wherein $R^1$ and $X^1$ have the respective meanings given under formula I above and $R^1$ preferably is n-alkyl and $X^1$ preferably is CN.

In a further preferred embodiment of the instant invention the media according to the present invention comprise one or more compounds of formula II selected from the group of its sub-formulae II-1 and II-2 and/or one or more compounds of formula III selected from the group of its sub-formulae III-1 and III-2

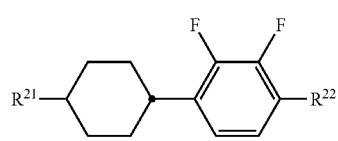

II-1

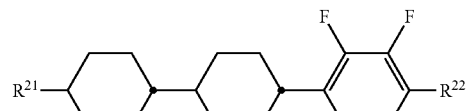

II-2

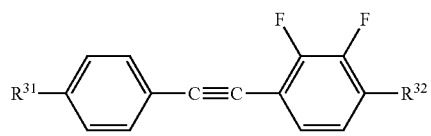

III-1

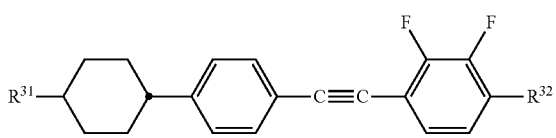

III-2 wherein the parameters have the respective meanings given under formula II, respectively under formula III, above and $R^{21}$ and $R^{31}$ preferably are independently of one another n-alkyl, $R^{22}$ preferably is n-alkyl or alkoxy and $R^{32}$ preferably is alkoxy.

In a preferred embodiment of the present instant invention the media according to the present invention comprise one or more compounds of formula II-1, preferably with $R^{21}$ being n-alkyl and $R^{22}$ being alkoxy and one or more compounds of formula II-2, preferably with $R^{21}$ being n-alkyl and $R^{22}$ being n-alkyl or alkoxy, most preferably n-alkyl.

In a further preferred embodiment of the instant invention the media according to the present invention comprise one or more compounds of formula III-1, preferably with $R^{31}$ being n-alkyl and $R^{32}$ being alkoxy and one or more compounds of formula III-2, preferably also with $R^{31}$ being n-alkyl and $R^{32}$ being alkoxy.

In still a further preferred embodiment of the instant invention the media according to the present invention comprise one or more compounds of formula II-1, preferably with $R^{21}$ being n-alkyl and $R^{22}$ being alkoxy, one or more compounds of formula II-2, preferably with $R^{21}$ being n-alkyl and $R^{22}$ being n-alkyl or alkoxy, most preferably n-alkyl and one or more compounds of formula III-2, preferably also with $R^{31}$ being n-alkyl and $R^{32}$ being alkoxy.

Preferably the media according to the present invention comprise one or more compounds of formula IV, which are preferably selected from the group of compounds of its sub-formulae IV-1 to IV-9, more preferably selected from the group of compounds of formulae IV-1 to IV-4 ad, most preferably selected from the group of compounds of formulae IV-1 and IV-3

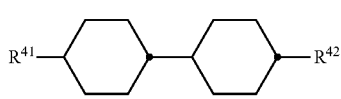

IV-1

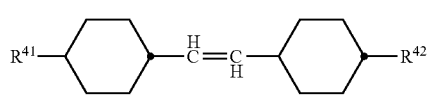

IV-2

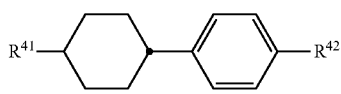

IV-3

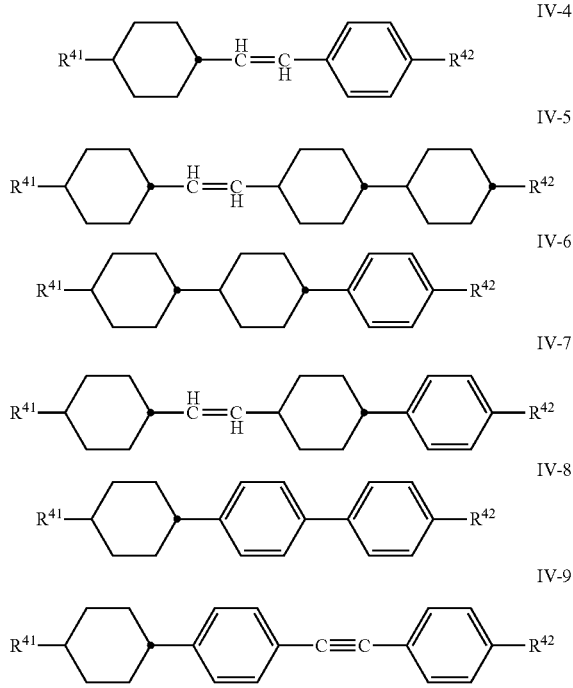

IV-4

IV-5

IV-6

IV-7

IV-8

IV-9 wherein $R^{41}$ and $R^{42}$ have the respective meanings given under formula IV above and generally and in particular in formulae IV-1 and IV-5, $R^{41}$ preferably is alkyl or alkenyl, preferably n-alkyl or 1-E-alkenyl and $R^{42}$ preferably is alkyl, alkoxy or alkenyl, preferably n-alkyl or alkoxy. Preferably the media comprise one or more compounds selected from the group of compounds of formulae IV-1 and IV-3 and, most preferably, one or more compounds each of formulae IV-1 and IV-3.

Preferred compounds of formula IV-1 are compounds of formulae CC-n-m, CC-n-Om, CC-n-V and CC-n-Vm, more preferably compounds of formula CC-n-O1, CC-3-V and CC-3-V1. Preferred compounds of formula IV-3 are compounds of formulae CP-n-m, CP-n-Om, CP-V-n and CP-nV-m, more preferably compounds of formula CP-n-m and CP-n-Om. The definitions of these abbreviations (acronyms) are explained in tables A to C and illustrated in table D below.

In a preferred embodiment the liquid crystalline media according to the present invention comprise one or more compounds of formula V selected from the group of compounds of its sub-formulae V-1 to V-4

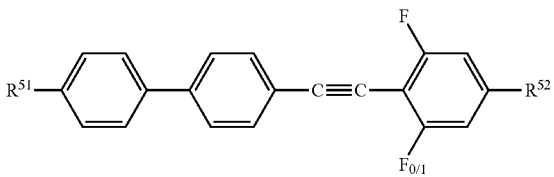

V-1

V-2

V-3

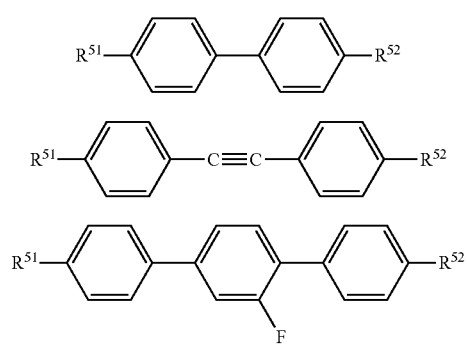

V-4 wherein $R^{51}$ and $R^{52}$ have the respective meanings given under formula V above and $R^{51}$ preferably is alkyl, more preferably n-alkyl and in formula V-1 $R^{52}$ preferably is alkenyl, preferably 3-alkenyl and most preferably —$(CH_2)_2$—CH=CH—$CH_3$ and in formula V-3 $R^{52}$ preferably is alkyl or alkenyl, preferably n-alkyl or 3-alkenyl and most preferably =$(CH_2)_2$—CH=$CH_2$, in formulae V-3 to V-6 $R^{52}$ preferably is alkyl and in V-4 "$F_{0/1}$" preferably is F.

Preferred compounds of formula V-1 are compounds of formulae PP-n-2V and PP-n-2Vm, more preferably compounds of formula PP-1-2V1. Preferred compounds of formula V-2 are compounds of formulae PTP-n-Om, especially preferred are PTP-1-O2, PTP-2-O1 and PTP-3-O1. Preferred compounds of formula V-3 are compounds of formulae PGP-n-m, PGP-n-2V and PGP-n-2Vm, more preferably of formulae PGP-2-m, PGP-3-m and PGP-n-2V. Preferred compounds of formula V-4 are compounds of formulae PPTUI-n-m, especially preferred PPTUI-3-2, PPTUI-3-3, PPTUI-3-4 and PPTUI-4-4. The definitions also of these abbreviations (acronyms) are explained in tables A to C and illustrated in table D below.

Preferably the liquid crystalline media according to the instant invention comprise, more preferably predominantly consist of, more preferably essentially consist of and most preferably entirely consist of compounds selected from the group of compounds of formulae I to V, more preferably of formulae I to IV.

"Comprising" in this application means in the context of compositions that the entity referred to, e.g. the medium or the component, contains the component or components or of the compound or compounds in question, preferably in a total concentration of 10% or more and most preferably of 20% or more unless explicitly defined otherwise.

In this context the term "predominantly consisting of" means that the entity referred to contains 55% or more, preferably 60% or more and most preferably 70% or more of the component or components or of the compound or compounds in question unless explicitly defined otherwise.

In this context the term "essentially consisting of" means that the entity referred to contains 80% or more, preferably 90% or more and most preferably 95% or more of the component or components or of the compound or compounds in question unless explicitly defined otherwise.

In this context the term "entirely consisting of" means that the entity referred to contains 98% or more, preferably 99% or more and most preferably 100.0% of the component or components or of the compound or compounds in question unless explicitly defined otherwise.

Also other mesogenic compounds, which are not explicitly mentioned above, can optionally and beneficially be used in the media according to the instant invention. Such compounds are known to the expert in the field.

The liquid crystal media according to the instant invention preferably have a clearing point of 85° C. or more, more preferably of 90° C. or more, more preferably of 95° C. or more and most preferably of 100° C. or more.

The value of the Δn of the liquid crystal media according to the instant invention, at 589 nm (Na$^D$) and 20° C., preferably is in the range of 0.100 or more to 0.350 or less, more preferably in the range of 0.120 or more to 0.250 or less and most preferably in the range of 0.125 or more to 0.220 or less.

The value of Δε, at 1 kHz and 20° C., of the liquid crystal medium according to the invention preferably is 1.0 or more, preferably 2.0 or more, more preferably 2.5 or more and most preferably 3.0 or more, whereas it preferably is 10 or less, more preferably 7 or less and more preferably it is in the range of 2.0 or more, to 5.0 or less and most preferably in the range of 2.5 to 4.5.

The value of $ε_⊥$, at 1 kHz and 20° C., of the liquid crystal medium according to the invention preferably is 4.0 or more, preferably 5.0 or more, more preferably 6.0 or more and most preferably 7.0 or more, whereas it preferably is 10 or less, more preferably 9.0 or less and more preferably it is in the range of 5.0 or more, to 8.0 or less and most preferably in the range of 6.0 to 7.5.

Preferably the nematic phase of the inventive media without the chiral dopants extends at least from 0° C. or less to 80° C. or more, more preferably at least from −20° C. or less to 85° C. or more, most preferably at least from −20° C. or less to 100° C. or more and in particular at least from −30° C. or less to 85° C. or more.

The liquid crystalline media are preferably characterized for comparison purposes in TN displays operating in the second transmission minimum according to Gooch and Tarry having an optical retardation (d·Δn) in the range of 1.0 μm or more to 1.1 μm or less.

Preferably the liquid crystal media contain 50% to 100%, more preferably 70% to 100% more preferably 80% to 100% and in particular 90% to 100% totally of compounds of formulae I, II, III, IV and V, preferably of formulae I, II, III and IV.

More preferably the liquid crystal media comprise, more preferably predominantly consist of, more preferably essentially consist of and most preferably entirely consist of compounds of formulae I, II, III, IV and V, more preferably of formulae I, III and IV or of formulae I, II, III and IV.

Compounds of formula I preferably are used in the media according to the present invention in a total concentration from 1% to 35%, more preferably from 2% to 30%, more preferably from 5% to 25% and most preferably from 10% to 20% of the total mixture.

Compounds of formulae II and III preferably are used together in the media according to the present invention in a total concentration from 30% to 70%, more preferably from 35% to 65%, more preferably from 40% to 60% and most preferably from 45% to 55% of the total mixture.

Compounds of formula II preferably are used in the media according to the present invention in a total concentration from 0% to 45%, more preferably from 0% to 40% and most preferably from 0% to 35% of the total mixture.

Compounds of formula III preferably are used in the media according to the present invention in a total concentration from 0% to 65%, more preferably from 0% to 60% and most preferably from 0% to 55% of the total mixture.

Compounds of formula IV preferably are used in the media in according to the present invention a total concentration from 15% to 50%, more preferably from 25% to 45% and most preferably from 30% to 40% of the total mixture.

Compounds of formula V preferably are used in the media in a total concentration from 0% to 30%, preferably from 0% to 25% and most preferably from 0% to 10% of the total mixture.

In a preferred embodiment of the present invention the compounds of formula II preferably are used in the media in a total concentration from 15% to 45%, more preferably from 20% to 40% and most preferably from 25% to 35% of the total mixture.

In that preferred embodiment of the present invention the compounds of formula III preferably are used in the media in a total concentration from 50% to 35%, more preferably from 10% to 30% and most preferably from 15% to 25% of the total mixture.

Preferably the media according to the present invention further comprise one or more chiral compounds as chiral dopants in order to adjust their cholesteric pitch. Their total concentration in the media according to the instant invention is preferably in the range 0.1% to 15%, more preferably from 0.1% to 10% and most preferably from 0.1% to 3%.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

Preferably the media according to the present invention comprise one or more compounds of
  formula I-2 and/or
  formula II-1, preferably of formula CY-n-Om, and/or
  formula II-2, preferably of formulae CCP-n-m and/or CCY-n-Om, and/or
  formula III-1, preferably of formulae PTY-n-Om, and/or
  formula III-2, preferably of formulae CPTY-n-Om, and/or
  formula IV-1, preferably of formulae CC-v-n and/or CC-n-Om, and/or
  formula IV-3, preferably of formulae CP-n-Orn and/or CP-n-m.

In the present application the term dielectrically positive is used for compounds or components with Δε>3.0, dielectrically neutral with −1.5≦Δε≦3.0 and dielectrically negative with Δε<−1.5 Δε is determined at a frequency of 1 kHz and at 20° C. The dielectric anisotropy of the respective compound is determined from the results of a solution of 10% of the respective individual compound in a nematic host mixture. In case the solubility of the respective compound in the host mixture is less than 10% its concentration is reduced by a factor of 2 until the resultant mixture is stable enough at least to allow the determination of its properties. Preferably the concentration is kept at least at 5%, however, in order to keep the significance of the results a high as possible. The capacities of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

Δε is defined as ($ε_∥−ε_⊥$), whereas $ε_{av}$, is ($ε_∥+2ε_⊥$)/3. For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericks-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties have been determined with test cells prepared at Merck KGaA, Germany. The test cells for the determination of Δ∈ had a cell gap of approximately 20 µm. The electrode was a circular ITO electrode with an area of 1.13 cm² and a guard ring. The orientation layers were JALS 2096-R1 from JSR (Japan Synthetic Rubber), Japan for homeotropic orientation ($\in_{\parallel}$) and polyimide AL-1054 also from JSR for planar homogeneous orientation ($\in_{\perp}$). The capacities were determined with a frequency response analyser Solatron 1260 using a sine wave with a voltage of 0.3 $V_{rms}$. The test cells used have cell gap selected to have an optical retardation matching the first transmission minimum according to Gooch and Tarry or below, typically of about 0.45 µm$^{-1}$. The light used in the electro-optical measurements was white light. The set up used was commercially available equipment of Autronic Meichers, Karlsruhe, Germany. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The response times are given as rise time ($\tau_{on}$) for the time for the change of the relative contrast from 0% to 90% ($t_{90}-t_0$), i.e. including the delay time ($t_{10}-t_0$), as decay time ($\tau_{off}$) for the time for the change of the relative contrast from 100% back to 10% ($t_{100}-t_{10}$) and as the total response time ($\tau_{total}=\tau_{on}+\tau_{off}$), respectively.

The liquid crystal media according to the present invention may contain further additives in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host mixture are specified. The concentration of the respective additives is always given relative to the final doped mixture.

The liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

These media may comprise more than one chiral dopant. In case they comprise two or more chiral dopants, these may beneficially selected in one of the known ways to compensate e.g. against the temperature dependence of the cholesteric pitch and, hence, of the wavelength of selective reflection. Here in one host mixture chiral dopants having the same sign of Helical Twisting Power (HTP) may be used as well as chiral dopants having the opposite sign of this parameter.

More preferred is an embodiment of the present invention using a single chiral dopant, which shows a small temperature dependence of the chiral pitch induced in the respective host mixture.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations, which are also called "acronyms". The transformation of the abbreviations into the corresponding structures is straight forward according to the following three tables A to C.

All groups $C_nH_{2n+1}$, $C_mH_{2m+1}$ and $C_lH_{2l+1}$ are preferably straight chain alkyl groups with n, m and l C-atoms, respectively, all groups $C_nH_{2n}$, $C_mH_{2m}$, and $C_lH_{2l}$ are preferably $(CH_2)_n$, $(CH_2)_m$ and $(CH_2)_l$, respectively and —CH=CH— preferably is trans- respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

| | Ring Elements |
|---|---|
| C | (cyclohexane ring) |
| P | (benzene ring) |
| D | (dioxane ring) |

TABLE A-continued

| Ring Elements | | |
|---|---|---|
| Dl | [2,5-disubstituted-1,3-dioxane] | |
| A | [2,5-disubstituted tetrahydropyran] | |
| Al | [2,5-disubstituted tetrahydropyran isomer] | |
| G | [3-fluoro-1,4-phenylene] | |
| Gl | [2-fluoro-1,4-phenylene] | |
| U | [2,3-difluoro-1,4-phenylene (3,4-F)] | |
| Ul | [3,5-difluoro-1,4-phenylene] | |
| Y | [2,3-difluoro-1,4-phenylene] | |
| M | [pyrimidine-2,5-diyl] | |
| Ml | [pyrimidine-2,5-diyl isomer] | |
| N | [pyridine-2,5-diyl] | |
| Nl | [pyridine-2,5-diyl isomer] | |
| np | [naphthalene-2,6-diyl] | |
| n3f | [trifluoronaphthalene-diyl] | |
| n3fl | [pyrimidine-2,5-diyl] | |
| th | [tetrahydronaphthalene-2,6-diyl] | |
| thl | [tetrahydronaphthalene isomer] | |
| th2f | [difluoro-tetrahydronaphthalene] | |
| th2fl | [difluoro-tetrahydronaphthalene isomer] | |
| o2f | [difluorochroman] | |
| o2fl | [difluorochroman isomer] | |
| dh | [decahydronaphthalene-2,6-diyl] | |

TABLE A-continued

Ring Elements

| | |
|---|---|
| K | 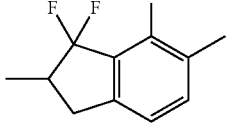 |
| KI | 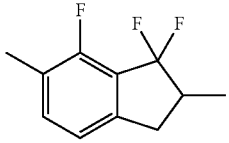 |
| L | 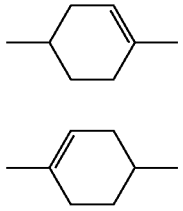 |
| LI |  |
| F | 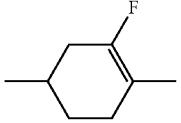 |
| FI | 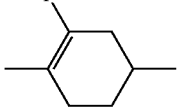 |

TABLE B

Linking Groups

| | | | | |
|---|---|---|---|---|
| E | —$CH_2$—$CH_2$— | | | |
| V | —CH=CH— | | | |
| T | —C≡C— | | | |
| W | —$CF_2$—$CF_2$— | | | |
| B | —CF=CF— | | | |
| Z | —CO—O— | | ZI | —O—CO— |
| X | —CF=CH— | | XI | —CH=CF— |
| O | —$CH_2$—O— | | OI | —O—$CH_2$— |
| Q | —$CF_2$—O— | | QI | —O—$CF_2$— |

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n und m each are integers and three points "..." indicate a space for other symbols of this table.

Preferably the liquid crystalline media according to the present invention comprise, besides the compound(s) of formula I one or more compounds selected from the group of compounds of the formulae of the following table.

TABLE D $C_nH_{2n+1}$—⬡—⬡—$C_mH_{2m+1}$

CC-n-m $C_nH_{2n+1}$—⬡—⬡—O—$C_mH_{2m+1}$

CC-n-Om $C_nH_{2n+1}$—⬡—⬡—CH=CH$_2$

CC-n-V $C_nH_{2n+1}$—⬡—⬡—CH=CH—$C_mH_{2m+1}$

CC-n-Vm $C_nH_{2n+1}$—⬡—⬡—(CH$_2$)$_m$—CH=CH—$C_lH_{2l+1}$

CC-n-mVl $C_nH_{2n+1}$—⬡—⌬—$C_mH_{2m+1}$

CP-n-m $C_nH_{2n+1}$—⬡—⌬—O—$C_mH_{2m+1}$

CP-n-Om

TABLE D-continued

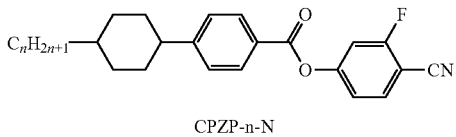

CPZP-n-N

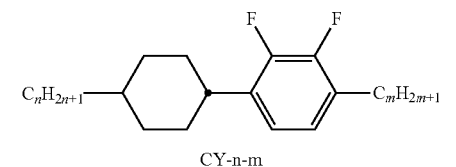

CY-n-m

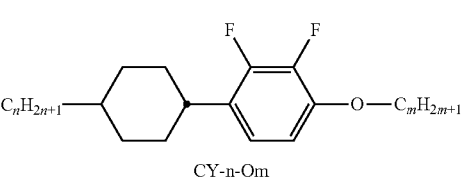

CY-n-Om

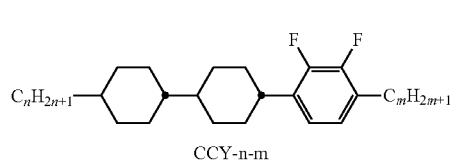

CCY-n-m

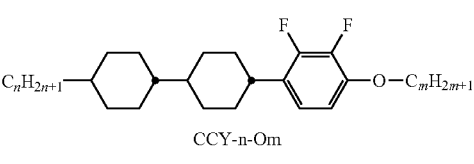

CCY-n-Om

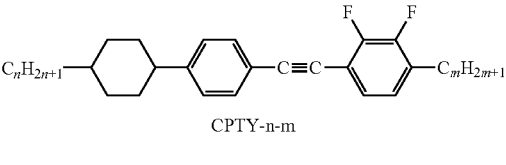

CPTY-n-m

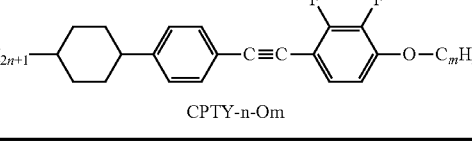

CPTY-n-Om

Table E lists chiral dopants, which are preferably used in the liquid crystalline media according to the present invention.

TABLE E

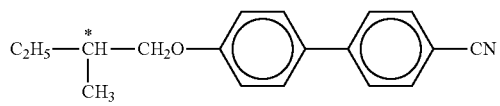

C 15

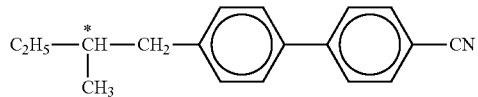

CB 15

TABLE E-continued
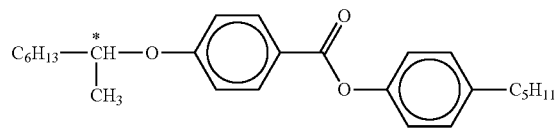
CM 21
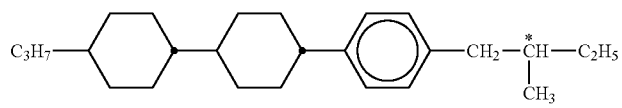
CM 44
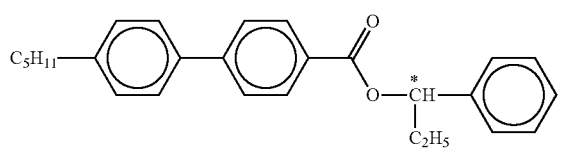
CM 45
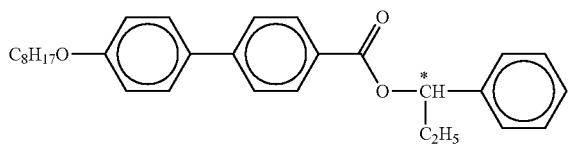
CM 47
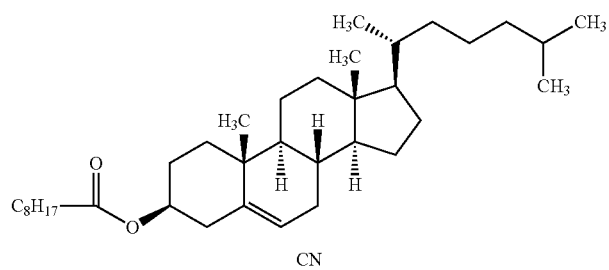
CN
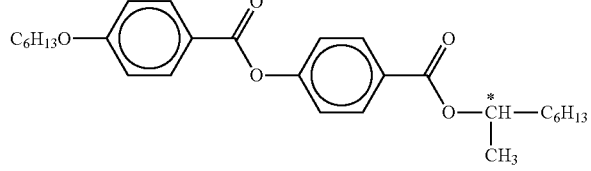
R S-811/S-811
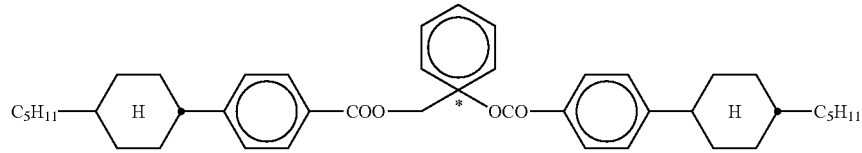
R-1011/S-1011
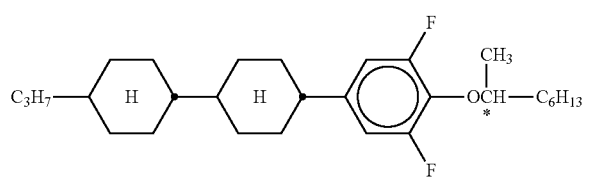
R-2011/S-2011

TABLE E-continued
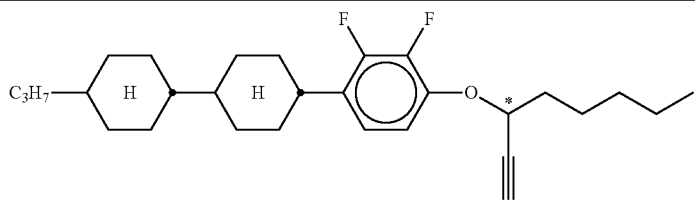
R-3011/S-3011
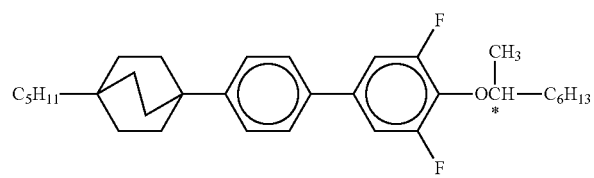
R-4011/S-4011
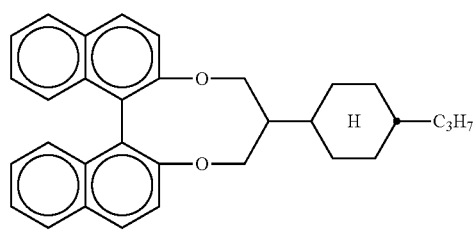
R-5011/S-5011
In a preferred embodiment of the present invention the media according to the present invention comprise one or more compounds selected from the group of compounds of table E.
Table F lists stabilizers, which are preferably used in the liquid crystalline media according to the present invention.
TABLE F
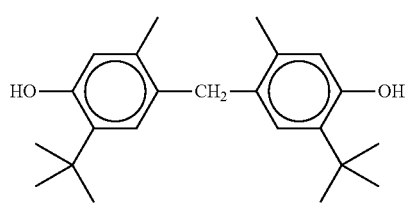
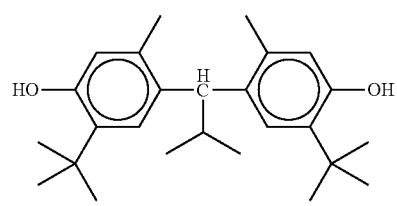
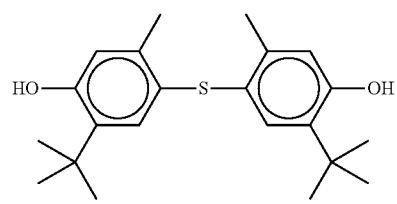

TABLE F-continued
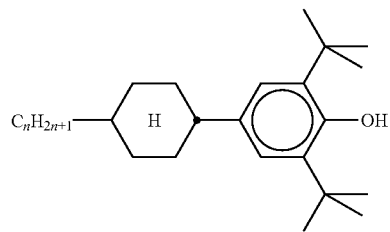
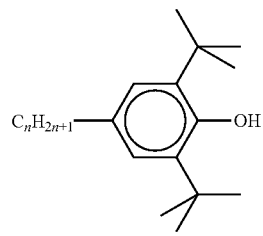
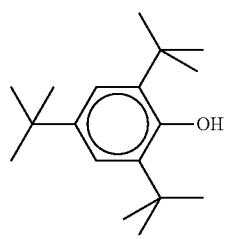
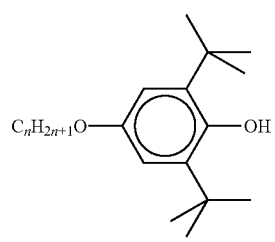
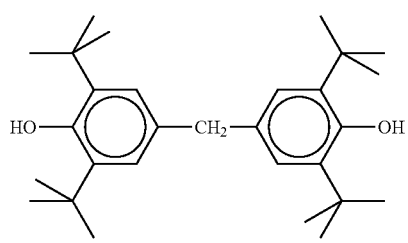
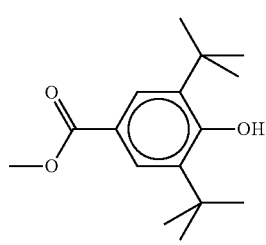

TABLE F-continued
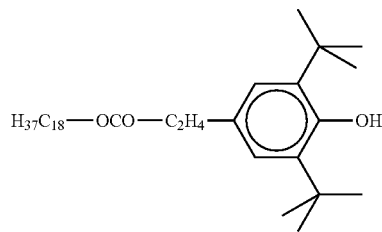
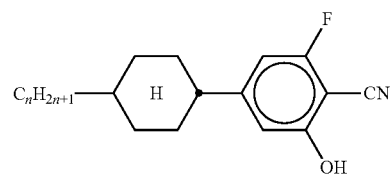
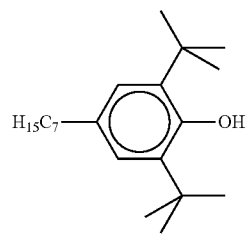
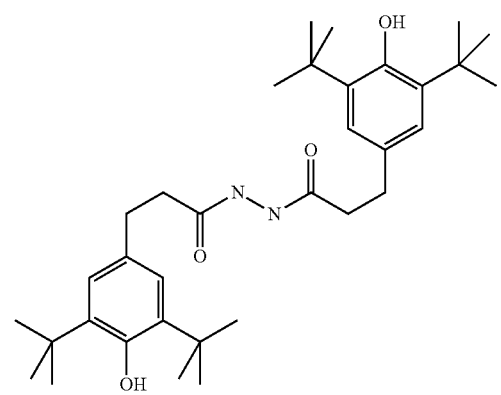 [SMILES: CC(C)(C)c1cc(CCC(=O)NNC(=O)CCc2cc(C(C)(C)C)c(O)c(C(C)(C)C)c2)cc(C(C)(C)C)c1O]
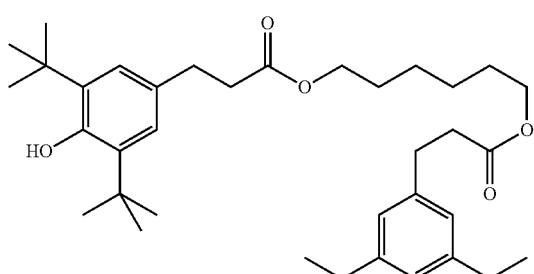
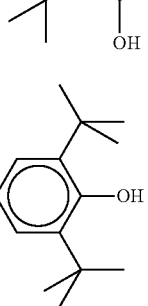

TABLE F-continued
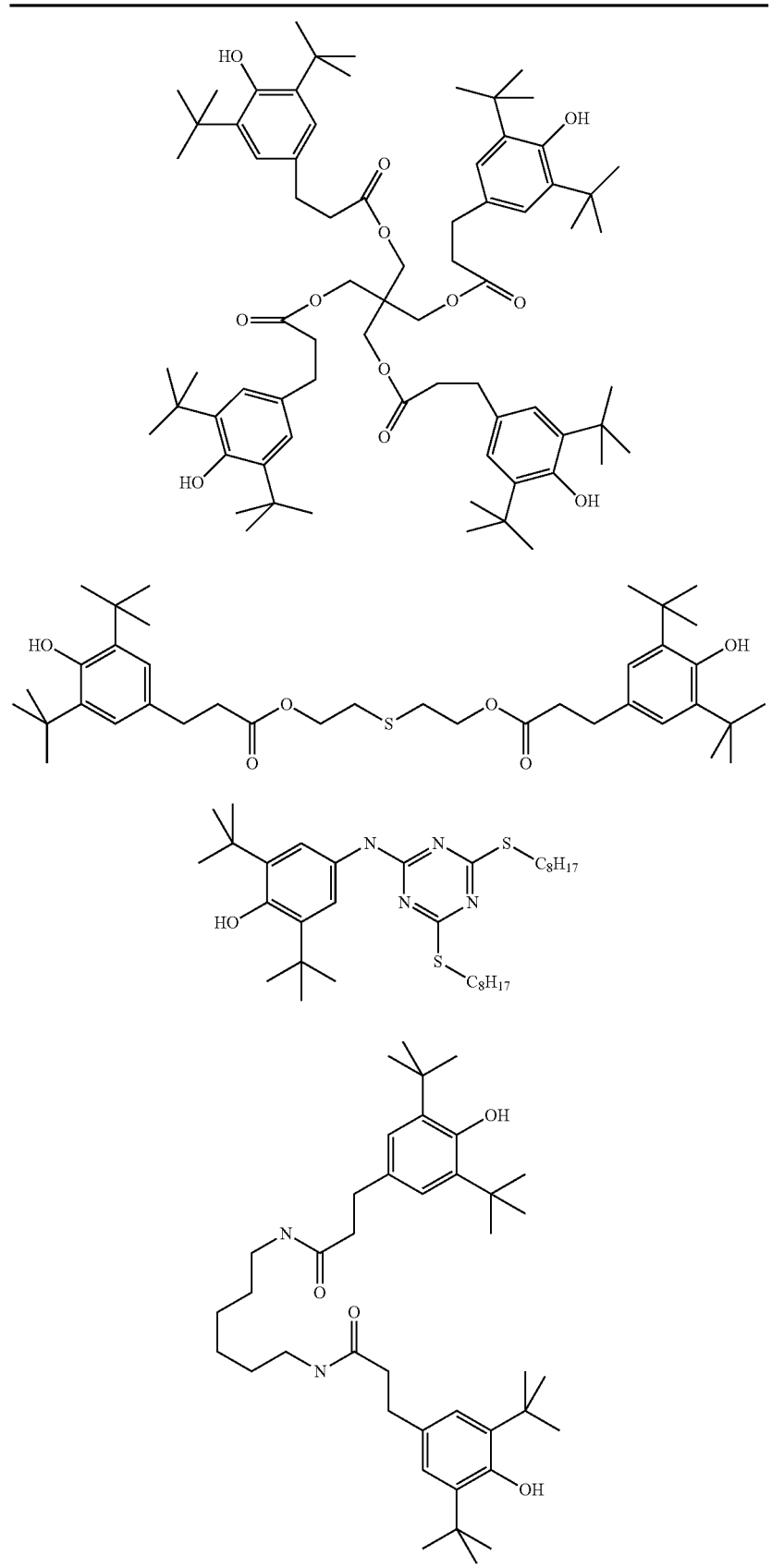

TABLE F-continued
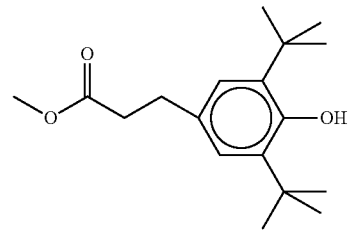
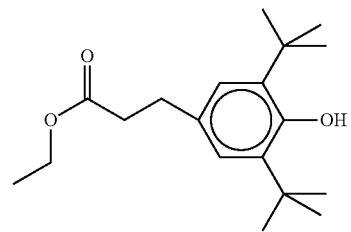
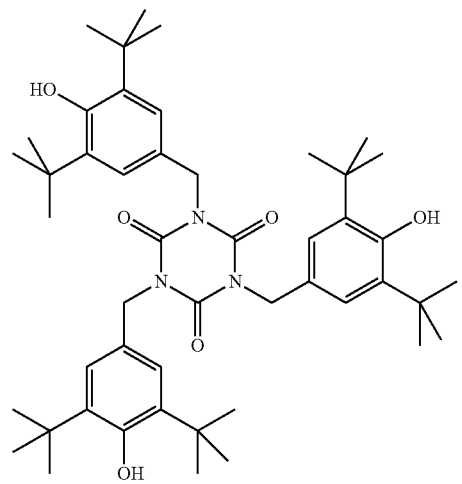 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
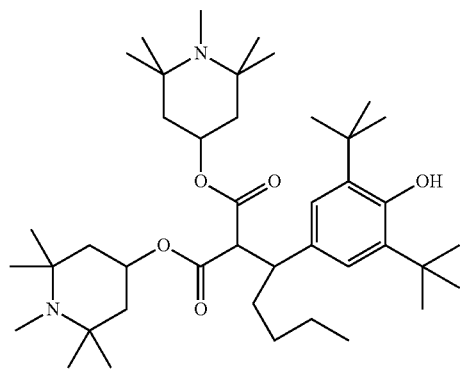 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
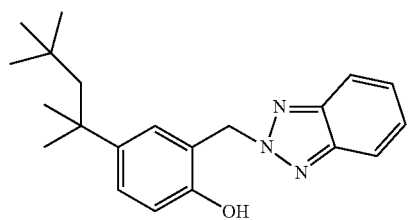 [SMILES: CC(C)(C)CC(C)(C)c1ccc(O)c(Cn2nc3ccccc3n2)c1]

TABLE F-continued
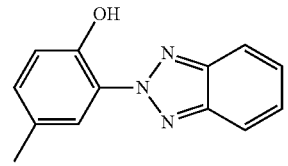 [SMILES: Cc1ccc(O)c(-n2nc3ccccc3n2)c1]
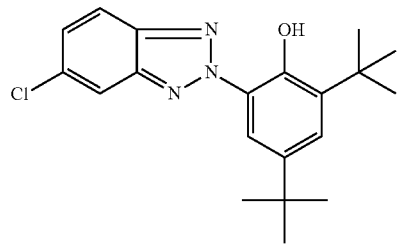 [SMILES: CC(C)(C)c1cc(-n2nc3ccc(Cl)cc3n2)c(O)c(C(C)(C)C)c1]
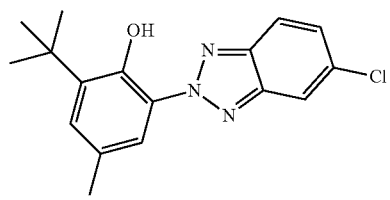 [SMILES: Cc1cc(-n2nc3ccc(Cl)cc3n2)c(O)c(C(C)(C)C)c1]
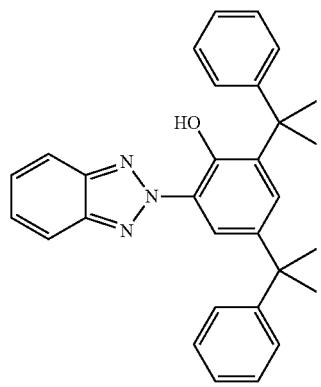 [SMILES: CC(C)(c1ccccc1)c1cc(-n2nc3ccccc3n2)c(O)c(C(C)(C)c2ccccc2)c1]
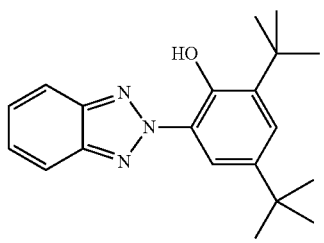 [SMILES: CC(C)(C)c1cc(-n2nc3ccccc3n2)c(O)c(C(C)(C)C)c1]
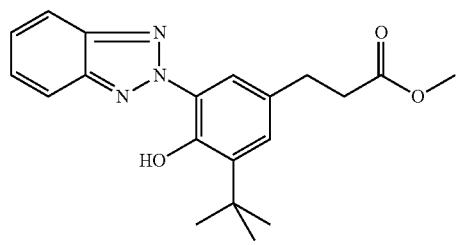 [SMILES: COC(=O)CCc1cc(-n2nc3ccccc3n2)c(O)c(C(C)(C)C)c1]

TABLE F-continued
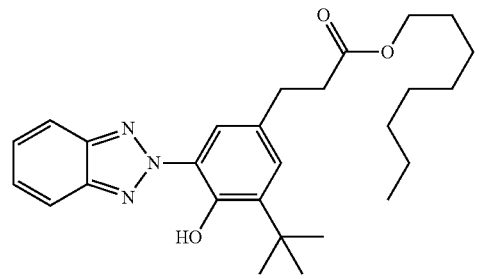 [SMILES: CCCCCCCCOC(=O)CCc1cc(-n2nc3ccccc3n2)c(O)c(C(C)(C)C)c1]
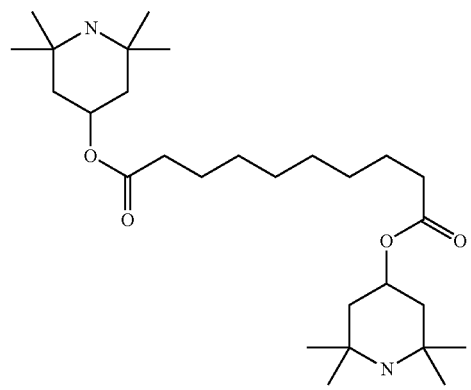
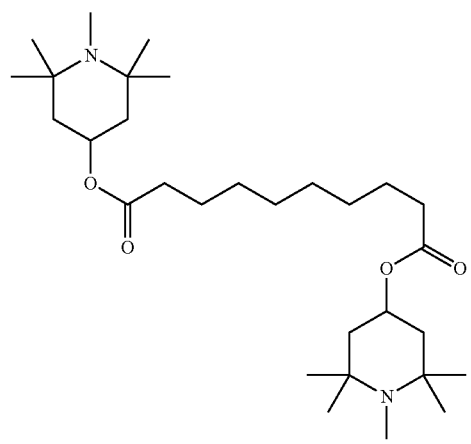
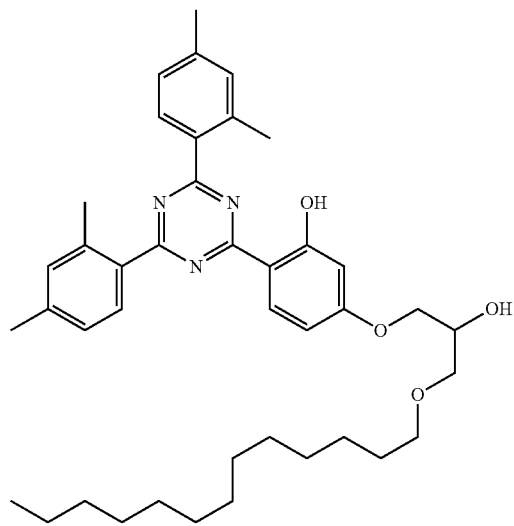 [SMILES: CCCCCCCCCCCCCOCC(O)COc1ccc(-c2nc(-c3ccc(C)cc3C)nc(-c3ccc(C)cc3C)n2)c(O)c1]

TABLE F-continued
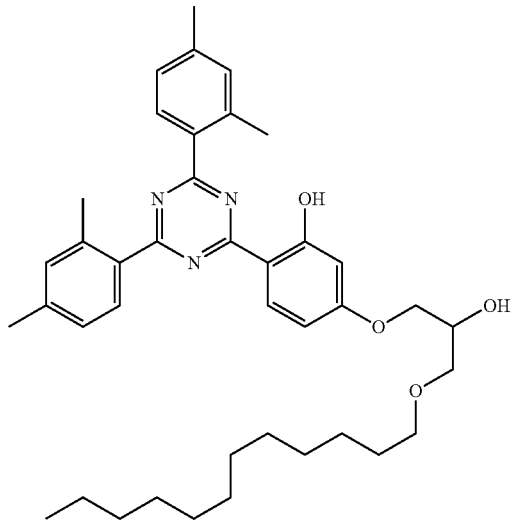 [SMILES: CCCCCCCCCCCCOCC(O)COc1ccc(-c2nc(-c3ccc(C)cc3C)nc(-c3ccc(C)cc3C)n2)c(O)c1]
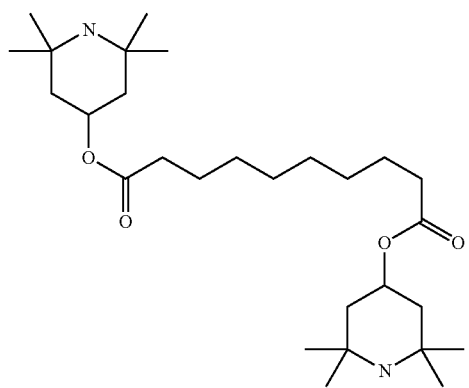
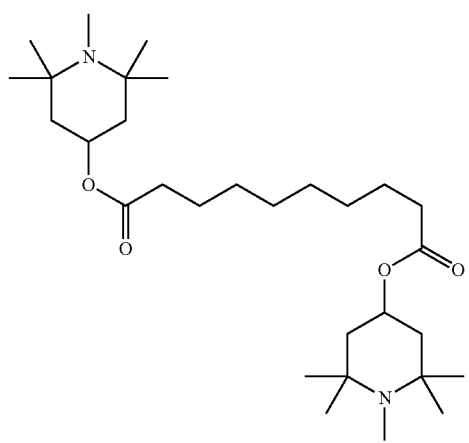

TABLE F-continued
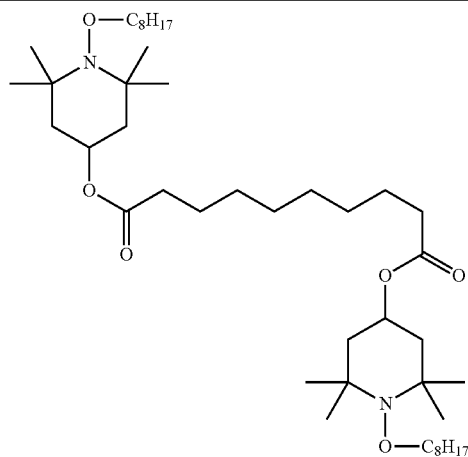
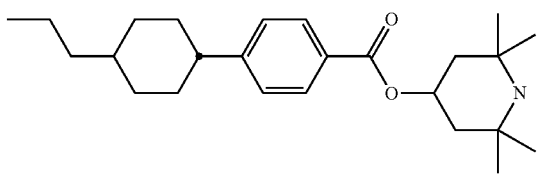
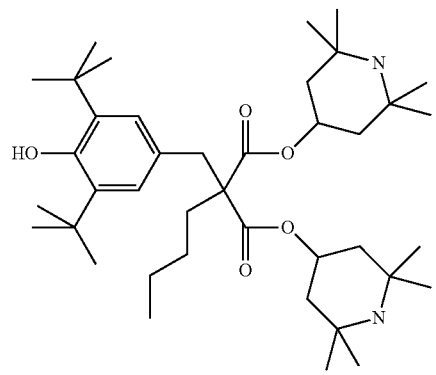 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
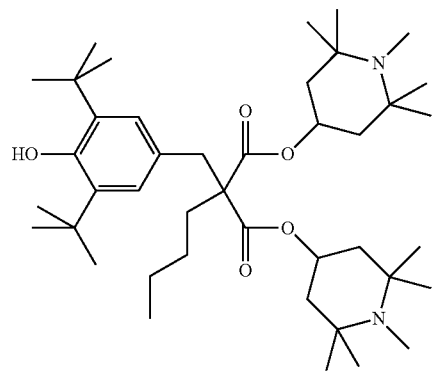 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]

TABLE F-continued
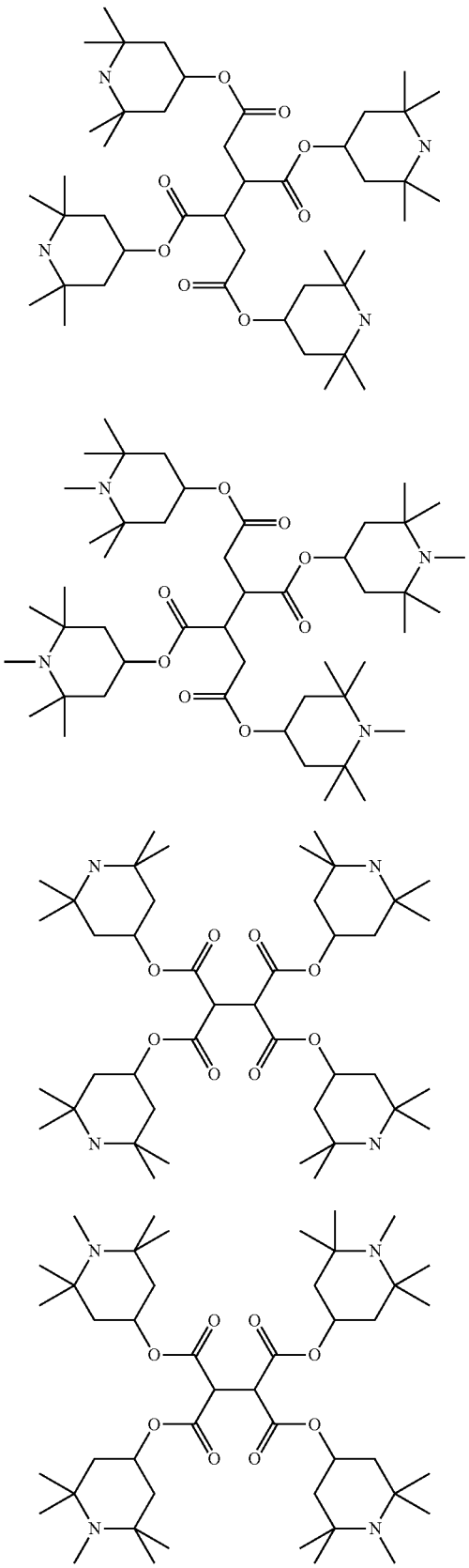

Remark: In this table "n" means an integer in the range from 1 to 12.

In a preferred embodiment of the present invention the media according to the present invention comprise one or more compounds selected from the group of compounds of table F.

The liquid crystalline media according to the present invention comprise preferably four or more, preferably six or more, compounds selected from the group of compounds of table D, preferably seven or more, preferably eight or more compounds, preferably compounds of three or more different formulae, selected from the group of formulae of table D.

EXAMPLES

The examples given in the following are illustrating the present invention without limiting it in any way.

However, the physical properties and compositions illustrate for the expert, which properties can be achieved and in which ranges they can be modified. Especially the combination of the various properties, which can be preferably achieved, is thus well defined for the expert.

Liquid crystal mixtures are realized with the compositions and properties given in the following tables. Their physical properties including their optical performance are investigated.

Example 1

TABLE 1

Composition and Properties of Liquid Crystal Mixture A

| Composition Compound | | |
|---|---|---|
| No. | Abbreviation | Conc./% |
| 1 | CPZG-5-N | 14.0 |
| 2 | PTY-3-O2 | 10.0 |
| 3 | PTY-5-O2 | 13.0 |
| 4 | CPTY-3-O2 | 12.0 |
| 5 | CPTY-5-O2 | 16.0 |
| 6 | CC-3-V | 7.0 |
| 7 | CP-3-O1 | 18.0 |
| 8 | CP-3-O2 | 10.0 |
| Σ | | 100.0 |

| Physical Properties | |
|---|---|
| T(N, I) = | 102.6° C. |
| $n_e$ (20° C., 589.3 nm) = | 1.6855 |
| Δn (20° C., 589.3 nm) = | 0.1924 |
| $\epsilon_{\parallel}$ (20° C., 1 kHz) = | 10.2 |
| $\epsilon_{\perp}$ (20° C., 1 kHz) = | 7.3 |
| Δε (20° C., 1 kHz) = | 2.9 |

This mixture is well suited for operation in a TN cell with 2-frequency addressing. It is also suited for use in a fast switching electro-optical device.

The dielectric anisotropy of mixture A changes its sign upon increase of the frequency of the electric field of the addressing voltage. At a frequency of 1 kHz Δε is positive and at 500 kHz Δε is negative. This is shown in the following table, table 2.

| Example | 1 | 2 | 3 | 4 | 5 | 6 |
|---|---|---|---|---|---|---|
| Mixture | A | B | C | D | E | F |
| Frequency | | | Δε | | | |
| 1 kHz | 2.8 | 3.0 | 3.0 | 3.0 | 3.0 | 3.1 |
| 500 kHz | −3.7 | −3.0 | −3.1 | −3.7 | −2.9 | −2.7 |

Example 2

TABLE 3

Composition and Properties of Liquid Crystal Mixture B

| Composition Compound | | |
|---|---|---|
| No. | Abbreviation | Conc./% |
| 1 | CPZG-5-N | 14.0 |
| 2 | CY-3-O4 | 8.0 |
| 3 | CCY-2-1 | 10.0 |
| 4 | CCY-3-1 | 13.0 |
| 5 | CPTY-3-O2 | 10.0 |
| 6 | CPTY-5-O2 | 10.0 |
| 7 | CC-3-V | 8.0 |
| 8 | CP-3-O1 | 17.0 |
| 9 | CP-3-O2 | 10.0 |
| Σ | | 100.0 |

| Physical Properties | |
|---|---|
| T(N, I) = | 99.6° C. |
| $n_e$ (20° C., 589.3 nm) = | 1.6220 |
| Δn (20° C., 589.3 nm) = | 0.1335 |
| $\epsilon_{\parallel}$ (20° C., 1 kHz) = | 9.4 |
| $\epsilon_{\perp}$ (20° C., 1 kHz) = | 6.3 |
| Δε (20° C., 1 kHz) = | 3.1 |

This mixture is well suited for operation in a TN cell with 2-frequency addressing. It is also suited for use in a fast switching electro-optical device.

Example 3

TABLE 4

Composition and Properties of Liquid Crystal Mixture C

| Composition Compound | | |
|---|---|---|
| No. | Abbreviation | Conc./% |
| 1 | CPZG-5-N | 14.0 |
| 2 | CY-3-O4 | 8.0 |
| 3 | CCY-2-1 | 10.0 |
| 4 | CCY-3-1 | 13.0 |
| 5 | CPTY-3-O2 | 10.0 |
| 6 | CPTY-5-O2 | 10.0 |
| 7 | CC-3-O1 | 5.0 |
| 8 | CC-5-O1 | 9.0 |
| 9 | CP-3-O1 | 16.0 |
| 10 | CP-3-O2 | 5.0 |
| Σ | | 100.0 |

TABLE 4-continued

Composition and Properties of Liquid Crystal Mixture C

Physical Properties

| | |
|---|---|
| T(N, I) = | 99.6° C. |
| $n_e$ (20° C., 589.3 nm) = | 1.6160 |
| Δn (20° C., 589.3 nm) = | 0.1290 |
| $\epsilon_{\parallel}$ (20° C., 1 kHz) = | 9.5 |
| $\epsilon_{\perp}$ (20° C., 1 kHz) = | 6.4 |
| Δε (20° C., 1 kHz) = | 3.1 |
| $\gamma_1$ (20° C.) = | 213 mPa·s |

This mixture is well suited for operation in a TN cell with 2-frequency addressing. It is also suited for use in a fast switching electro-optical device.

Example 4

TABLE 5

Composition and Properties of Liquid Crystal Mixture D

Composition
Compound

| No. | Abbreviation | Conc./% |
|---|---|---|
| 1 | CPZG-5-N | 14.0 |
| 2 | PTY-3-O2 | 10.0 |
| 3 | PTY-5-O2 | 13.0 |
| 4 | CPTY-3-O2 | 12.0 |
| 5 | CPTY-5-O2 | 16.0 |
| 6 | CP-3-O1 | 16.0 |
| 7 | CP-3-O2 | 10.0 |
| 8 | PTP-3-O1 | 7.0 |
| Σ | | 100.0 |

Physical Properties

| | |
|---|---|
| T(N, I) = | 104.7° C. |
| $n_e$ (20° C., 589.3 nm) = | 1.7112 |
| Δn (20° C., 589.3 nm) = | 0.2142 |
| $\epsilon_{\parallel}$ (20° C., 1 kHz) = | 10.4 |
| $\epsilon_{\perp}$ (20° C., 1 kHz) = | 7.4 |
| Δε (20° C., 1 kHz) = | 3.0 |
| $\gamma_1$ (20° C.) = | 346 mPa·s |

This mixture is well suited for operation in a TN cell with 2-frequency addressing. It is also suited for use in a fast switching electro-optical device.

Example 5

TABLE 6

Composition and Properties of Liquid Crystal Mixture E

Composition
Compound

| No. | Abbreviation | Conc./% |
|---|---|---|
| 1 | CPZG-5-N | 14.0 |
| 2 | CCY-2-1 | 10.0 |
| 3 | CCY-3-1 | 10.0 |
| 4 | CCY-3-O2 | 8.0 |
| 5 | PTY-3-O2 | 10.0 |
| 6 | PTY-5-O2 | 13.0 |
| 7 | CC-3-V | 30.0 |
| 8 | CP-3-O1 | 5.0 |
| Σ | | 100.0 |

TABLE 6-continued

Composition and Properties of Liquid Crystal Mixture E

Physical Properties

| | |
|---|---|
| T(N, I) = | 85.2° C. |
| $n_e$ (20° C., 589.3 nm) = | 1.6156 |
| Δn (20° C., 589.3 nm) = | 0.1308 |
| $\epsilon_{\parallel}$ (20° C., 1 kHz) = | 9.3 |
| $\epsilon_{\perp}$ (20° C., 1 kHz) = | 6.2 |
| Δε (20° C., 1 kHz) = | 3.1 |

This mixture is well suited for operation in a TN cell with 2-frequency addressing. It is also suited for use in a fast switching electro-optical device.

Example 6

TABLE 7

Composition and Properties of Liquid Crystal Mixture F

Composition
Compound

| No. | Abbreviation | Conc./% |
|---|---|---|
| 1 | CPZG-5-N | 14.0 |
| 2 | CCY-3-O4 | 8.0 |
| 3 | CCY-2-1 | 10.0 |
| 4 | CCY-3-1 | 10.0 |
| 5 | CPTY-3-O2 | 10.0 |
| 6 | CPTY-5-O2 | 13.0 |
| 7 | CC-3-V | 20.0 |
| 8 | CP-5-3 | 15.0 |
| Σ | | 100.0 |

Physical Properties

| | |
|---|---|
| T(N, I) = | 100.0° C. |
| $n_e$ (20° C., 589.3 nm) = | 1.6148 |
| Δn (20° C., 589.3 nm) = | 0.1297 |
| $\epsilon_{\parallel}$ (20° C., 1 kHz) = | 8.9 |
| $\epsilon_{\perp}$ (20° C., 1 kHz) = | 5.8 |
| Δε (20° C., 1 kHz) = | 3.1 |

This mixture is well suited for operation in a TN cell with 2-frequency addressing. It is also suited for use in a fast switching electro-optical device.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 10003247.3, filed Mar. 26, 2010 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A liquid crystal medium, comprising one or more compounds of formula I

$$R^1-\bigcirc-A^1-C(O)O-\bigcirc(L^{11})(L^{12})-X^1 \quad I$$

wherein
R¹ is alkyl or alkoxy with 1 to 7 C-atoms or alkenyl, alkenyloxy or alkoxyalkyl with 2 to 7 C-atoms $A^1$ is cyclohexylene, phenylene, or 2-fluoro-1,4-phenylene, $L^{11}$ and $L^{12}$ are independently of each other H or F and $X^1$ is CN or NCS,
and
one or more compounds of formula II and one or more compounds of formula III $$R^{21}-\bigcirc-[A^2]_m-\bigcirc(F)(F)-R^{22} \quad II$$

$$R^{31}-[A^3]_n-\bigcirc-C\equiv C-\bigcirc(F)(F)-R^{32} \quad III$$

wherein
$R^{21}$, $R^{22}$, $R^{31}$ and $R^{32}$, independently of each other, are alkyl or alkoxy with 1 to 7 C-atoms, alkenyl, alkenyloxy or alkoxyalkyl with 2 to 7 C-atoms, $A^2$ is cyclohexylene, phenylene, or 2-fluoro-1,4-phenylene, $A^3$ is cyclohexylene or -continued phenylene, and
m and n are, independently of each other, 0 or 1,
and optionally
one or more compounds of formulae IV and V $$R^{41}-\bigcirc-[Z^{41}-A^{41}]_p-Z^{42}-A^{42}-R^{42} \quad IV$$

$$R^{51}-\bigcirc-[Z^{51}-A^{51}]_q-Z^{52}-A^{52}-R^{42} \quad V$$

wherein
$R^{41}$, $R^{42}$, $R^{51}$ and $R^{52}$ independently of each other, are alkyl or alkoxy with 1 to 7 C-atoms, alkenyl, alkenyloxy or alkoxyalkyl with 2 to 7 C-atoms, $A^{41}$ and $A^{42}$ independently of each other and in case $A^{41}$ is present twice, also these independently of each other are various ring groups (cyclohexylene-H, cyclohexylene, cyclohexenylene, cyclohexenylene, phenylene, fluoro-phenylene, fluoro-phenylene, difluoro-phenylene), -continued

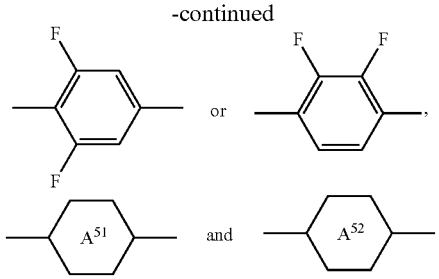

independently of each other and in case

is present twice, also these independently of each other are

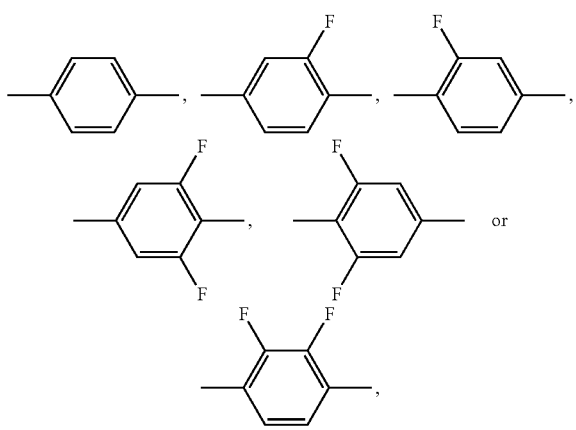

$Z^{41}$, $Z^{42}$, $Z^{51}$ and $Z^{52}$ independently of each other, and in case $Z^{41}$ and/or $Z^{51}$ is/are present twice, also these independently of each other, are —CH$_2$CH$_2$—, —COO—, trans- —CH=CH—, trans- —CF=CF—, —CH$_2$O—, —CF$_2$O—, —C≡C— or a single bond, and p and q are, independently of each other, 0, 1 or 2, and optionally one or more chiral compounds, wherein ∆∈ is 1.0 or more and 10 or less.

2. A liquid crystal medium according to claim 1, wherein the total concentration of the compounds of formula I in the medium is in the range of 1% to 35%.

3. A liquid crystal medium according to claim 1, which comprises one or more compounds of formula I-1

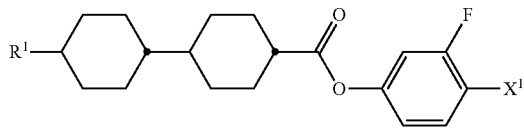

wherein R$^1$ and X$^1$ have the meanings given under formula I.

4. A liquid crystal medium according to claim 1, which comprises one or more compounds of formula II-1

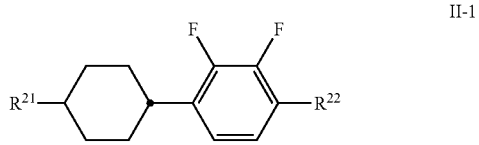

wherein R$^{21}$ and R$^{22}$ have the meanings given under formula II.

5. A liquid crystal medium according to claim 1, which comprises one or more compounds of formula III-1

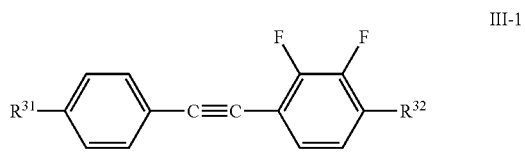

wherein R$^{31}$ and R$^{32}$ have the meanings given under formula III.

6. A liquid crystal medium according to claim 1, which comprises one or more compounds of formula IV and/or of formula V.

7. A liquid crystal medium according to claim 6, which comprises one or more compounds of formula IV.

8. A liquid crystal device, containing a liquid crystal medium according to claim 1.

9. A liquid crystal device according to claim 8, which is addressable by two frequency addressing.

10. A liquid crystal device according to claim 8, which is operable as a fast switching optical device.

11. A method for preparing a liquid crystal medium according to claim 1, comprising mixing together one or more compounds of formula I, one or more compounds of formula II and one or more compounds of formula III and optionally one or more compounds of formulae IV and/or V.

12. An electro-optical display comprising one or more liquid crystal devices according to claim 9.

13. A method of displaying 3D information, comprising displaying said 3D information by a device according to claim 9.

14. A device according to claim 10, which is an electro-optical shutter.

15. A liquid crystal medium according to claim 1, wherein ∆∈ at 1 kHz is 2.0 or more and 7 or less.

16. A liquid crystal medium according to claim 1, wherein ∆∈ at 1 kHz is 2.5 or more and 4.5 or less.

17. A liquid crystal medium according to claim 1, which comprises one or more compounds of formula I-2

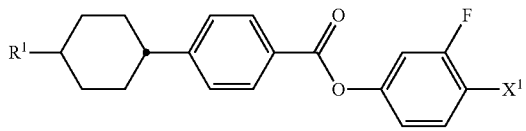

wherein R$^1$ and X$^1$ have the meanings given under formula I.

18. A liquid crystal medium according to claim 1, which comprises one or more compounds of formula I-3

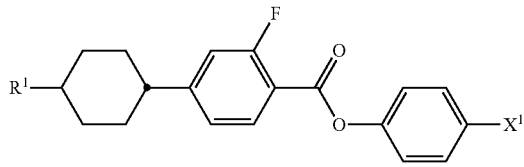

I-3 wherein $R^1$ and $X^1$ have the meanings given under formula I.

19. A liquid crystal medium according to claim 1, which comprises one or more compounds of formula II-2

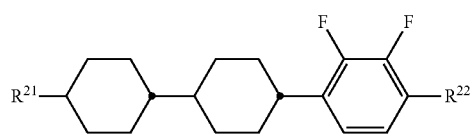

II-2 wherein $R^{21}$ and $R^{22}$ have the meanings given under formula II.

20. A liquid crystal medium according to claim 1, which comprises one or more compounds of formula III-2

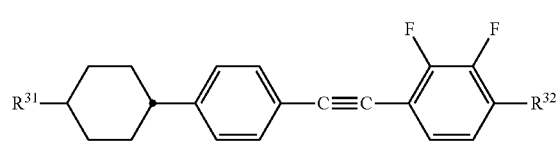

III-2 wherein $R^{31}$ and $R^{32}$ have the meanings given under formula III.

21. A liquid crystal medium according to claim 1, which comprises one or more compounds of formula IV-1

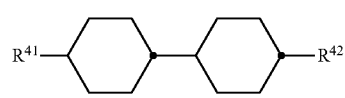

IV-1 wherein $R^{41}$ and $R^{42}$ have the meanings given under formula IV.

22. A liquid crystal medium according to claim 1, which comprises one or more compounds of formula CC-n-m and/or CC-n-Om

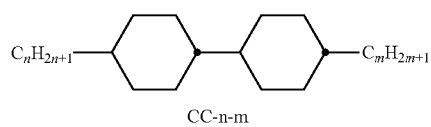

CC-n-m

-continued

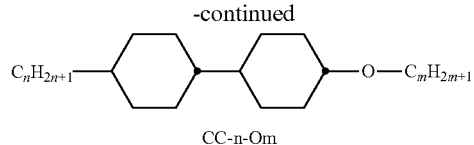

CC-n-Om wherein n and m are each independently 1 to 7.

23. A liquid crystal medium according to claim 22, which comprises one or both of the compounds CC-3-O1 and/or CC-5-O1.

24. A liquid crystal medium according to claim 1, which comprises one or more compounds of formula CC-n-V and/or CC-n-Vm

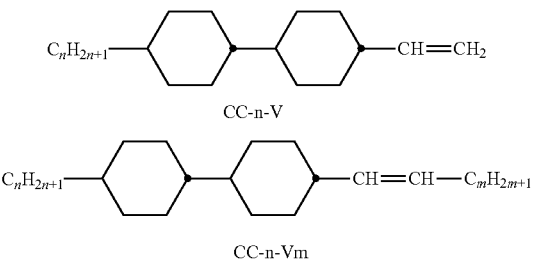

CC-n-V

CC-n-Vm wherein n is 1 to 7 and m is 1 to 5.

25. A liquid crystal medium according to claim 24, which comprises the compound CC-3-V.

26. A liquid crystal medium, comprising
one or more compounds of formula I

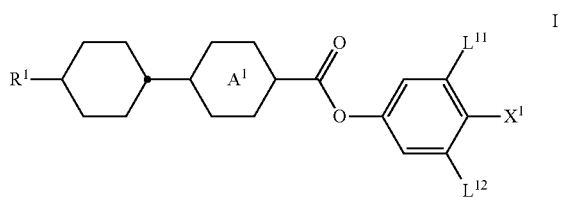

I wherein
$R^1$ is alkyl with 1 to 7 C-atoms

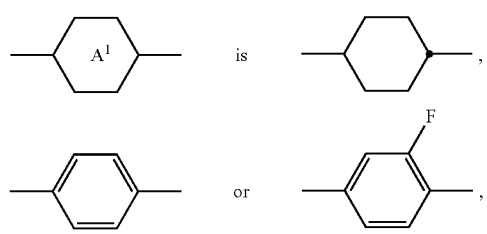

$L^{11}$ and $L^{12}$ are independently of each other H or F and
$X^1$ is CN or NCS,
and
one or more compounds of formula II and one or more compounds of formula III

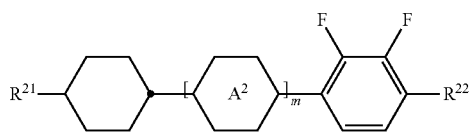   II

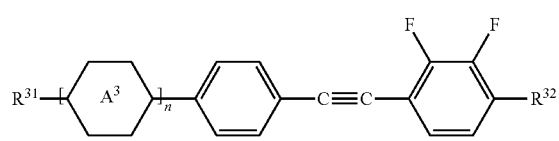   III wherein
$R^{21}$, $R^{22}$, $R^{31}$ and $R^{32}$, independently of each other, are alkyl or alkoxy with 1 to 7 C-atoms, alkenyl, alkenyloxy or alkoxyalkyl with 2 to 7 C-atoms,

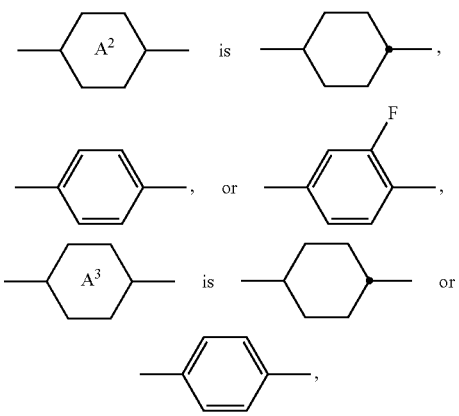

and
m and n are, independently of each other, 0 or 1,
and optionally
one or more compounds of formulae IV and V

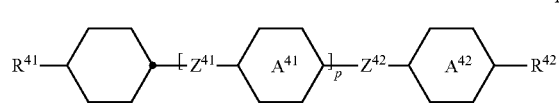   IV

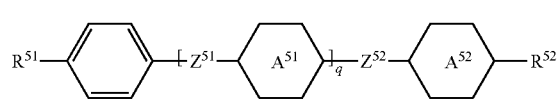   V wherein
$R^{41}$, $R^{42}$, $R^{51}$ and $R^{52}$ independently of each other, are alkyl or alkoxy with 1 to 7 C-atoms, alkenyl, alkenyloxy or alkoxyalkyl with 2 to 7 C-atoms,

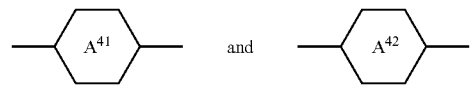

independently of each other and in case

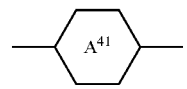

is present twice, also these independently of each other are

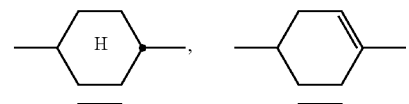

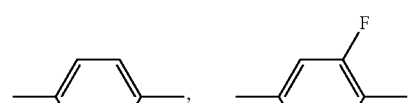

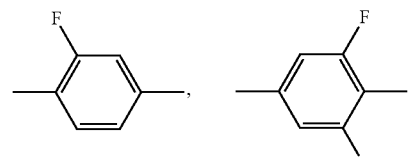

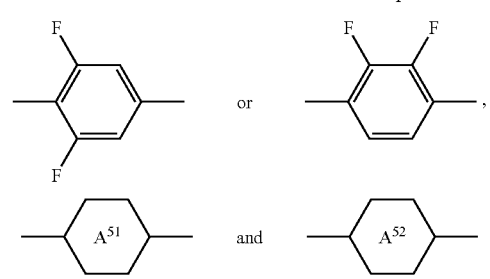

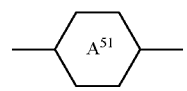

independently of each other and in case

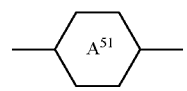

is present twice, also these independently of each other are

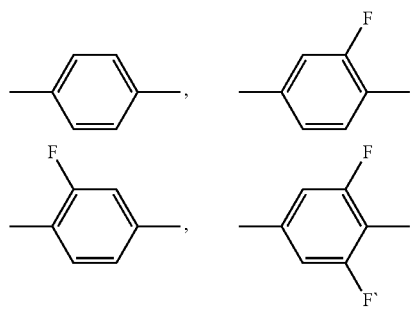

-continued
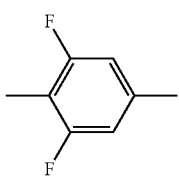 or 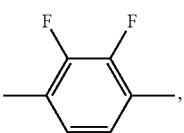,
$Z^{41}$, $Z^{42}$, $Z^{51}$ and $Z^{52}$ independently of each other, and in case $Z^{41}$ and/or $Z^{51}$ is/are present twice, also these independently of each other, are —CH$_2$CH$_2$—, —COO—, trans- —CH=CH—, trans- —CF=CF—, —CH$_2$O—, —CF$_2$O—, —C≡C— or a single bond, and
p and q are, independently of each other, 0, 1 or 2, and
optionally one or more chiral compounds,
wherein Δ∈ is 1.0 or more and 10 or less.
* * * * *